United States Patent [19]

Villa et al.

[11] 4,424,074

[45] Jan. 3, 1984

[54] ADDITIVES FOR CEMENTITIOUS COMPOSITIONS

[75] Inventors: Jose L. Villa, Bridgewater; Joseph V. Sinka, Mendham; Alphonso W. Marcellis, Boonton; Joseph P. Fleming, East Brunswick, all of N.J.

[73] Assignee: Diamond Shamrock Corporation, Dallas, Tex.

[21] Appl. No.: 411,033

[22] Filed: Aug. 24, 1982

[51] Int. Cl.$^3$ ................................................ C04B 7/35
[52] U.S. Cl. ...................................... 106/90; 106/314
[58] Field of Search .................................. 106/90, 314

[56] References Cited

U.S. PATENT DOCUMENTS

| | | | |
|---|---|---|---|
| 3,429,724 | 2/1969 | Keenum et al. | 106/89 |
| 3,537,869 | 11/1970 | Proell | 106/95 |
| 4,164,426 | 8/1979 | Sinka et al. | 106/90 |

*Primary Examiner*—James Poer
*Attorney, Agent, or Firm*—Leslie G. Nunn, Jr.

[57] ABSTRACT

Additives for cementitious compositions which are mixtures of (1) salts such as the sodium salt of a condensation product of naphthalenesulfonic acid and formaldehyde and (2) zinc salts increase compressive strengths and reduce water contents of hardened cementitious compositions. Useful additives include mixtures of from 65% to about 75% by weight of a sodium salt of a condensation product of naphthalenesulfonic acid and formaldehyde and from about 25 to about 35% by weight of a zinc salt such as zinc sulfate, zinc chloride, zinc acetate or the like. Effective amounts of these additives are added to cementitious compositions to improve their properties. Addition of effective amounts of these mixtures in cementitious strengths from 25 to 30% greater over those obtained with a sodium salt of the condensation product.

13 Claims, No Drawings

ADDITIVES FOR CEMENTITIOUS COMPOSITIONS

BACKGROUND OF THE INVENTION

1. Field of the Invention

This invention relates to additives for cementitious compositions.

2. Description of the Prior Art

Cementitious compositions include cement, cement slurries, mortar, grout and concrete. Mortar is a mixture of cement, sand and water. Concrete is a mixture of cement, sand, gravel and water. Water in either mixture causes the cement to hydrate, set and bind the entire mixture in a hard mass. Compressive strength as measured by the ASTM test C39-72 is a reliable criterion of the general quality of the hardened mass. For this reason, concrete technology has developed around obtaining a significant and practical strength with a minium of cost, and a maximum of convenience in use. Despite extensive research, most concrete and mortar presently being used are simple mixtures of sand and coarse stone or sand containing a minor proportion of portland cement with sufficient water being added to produce a cementitious composition which is fluid enough to be placed in forms.

It is well known in the art that, the less water used in a cementitious composition, the greater its strength. Considerable research has been directed towards discovering mixtures of different particle sizes of sand and stone which will give fluid concrete or mortar having minimum water content. Various organic and inorganic additives which permit reduction in the water content of concrete, have been discovered. One such additive, the sodium salt of the condensation product of naphthalenesulfonic acid and formaldehyde is used commercially for this purpose. See U.S. Pat. No. 2,141,569—Tucker, issued Dec. 27, 1938.

U.S. Pat. No. 3,537,869—Proell, issued Nov. 3, 1970, describes use of additives containing sulfonated condensation products of formaldehyde and naphthalene or salts thereof in concrete mixes to increase compressive strength of the hardened concrete.

U.S. Pat. No. 3,429,724—Keenum, Jr. et al, issued Feb. 25, 1969, describes use of zinc salts such as zinc choride, zinc sulfate, zinc nitrate and zinc acetate to retard hardening of concrete mixes.

U.S. Pat. No. 4,164,426—Sinka et al, issued Aug. 14, 1979, describes use of zinc salts of condensation products of naphthalenesulfonic acid and formaldehyde in concrete mixes to improve compressive strength.

SUMMARY OF THE INVENTION

Additives for cementitious composition which are mixtures of (1) salts of condensation product of naphthalenesulfonic acid and formaldehyde and (2) zinc salts increase compressive strengths and reduce water contents. Useful additive mixtures may contain from 65% to about 75% by weight of a sodium salt of a condensation product of naphthalenesulfonic acid and formaldehyde and from about 25 to about 35% by weight of a zinc salt such as zinc sulfate, zinc choride, zinc acetate and the like. An effective amount of the additive mixture is added to the cementitious composition to improve its properties. Use of these additive mixtures in cementitious compositions such as concrete can increase compressive strengths from 25 to 30% greater than those obtained with the sodium salt of the condensation product alone.

DETAILED DESCRIPTION

Additive for cementitious composition may be prepared by mixing a salt of a condensation product of naphthalenesulfonic acid and formaldehyde with a zinc salt. Useful additive mixtures may be prepared by blending the desired quantities of these two components. The components may be in solid or liquid form. From about 65 to about 75% by weight of a salt of the condensation product may be added to from about 25 to about 35% by weight of zinc salt.

Salts of condensation products of naphthalenesulfonic acid and formaldehyde are prepared by first condensing formaldehyde and naphthalenesulfonic acid using a molar ratio of about 1 to about 3 moles of formaldehyde per mole of sulfonic acid. Condensation can be carried out at temperatures from about 60° C. to about 130° C., preferably from about 95° C. to about 120° C. Condensation is carried out until the product has a specific property such as the viscosity of aqueous salt solution in U.S. Pat. No. 3,277,162—Johnson, issued Oct. 4, 1966 or the elution volume in U.S. Pat. No. 4,164,426—Sinka et al issued Aug. 14, 1979. If desired, the condensation product containing free sulfuric acid can be treated with lime to precipitate calcium sulfate which is filtered off to obtain a low salt content product. The remaining sulfuric acid in the mixture is then neutralized with a base to form a salt of naphthalenesulfonic acid condensate containing minor amount of sodium sulfate. A zinc salt can be added to the solution or powder and can be used directly in cementitious materials. The condensation product is then neutralized with a base such as sodium hydroxide to obtain the desired salt. Bases such as potassium hydroxide, ammonium hydroxide, calcium hydroxide, methylamines, ethanolamines, propanolamines and the like may be used.

Zinc salts which may be mixed with salts of condensation products of naphthalenesulfonic acid and formaldehyde include zinc sulfate, zinc choride, zinc acetate and the like. The resulting additive mixture, depending on its physical form, may be added directly in cementitious materials such as cement slurries, mortar, grout and concrete mixtures. If desired, the mixture may be dried, ground and added to dry powdered formulations.

These additive mixtures may be added to cementitious materials at any point during processing. When in powdered form, they may be added to portland cement clinker prior to grinding and thoroughly mixed with the cement during grinding. They may also be added to the ground cement powder as a dry powder, slurry or water solution and the ingredients can be thoroughly mixed to disperse uniformly. Additive mixtures may be added to the water in which the cement, sand and/or gravel are mixed. The dry powdered cement may be premixed with water and then the additive mixture added. In general, additive mixtures may be added to a cementitious composition at any stage prior to its final hardening.

Portland cements used in the preparation of these cementitious compositions include Type I, II and III cements. The properties of these cements are well known and are described in the Portland Cement Association Engineering Bulletin entitled, "Design and Control of Concrete Mixtures", Eleventh Edition, July 1968 and "Kirk-Othmer Encyclopedia of Chemical Technology", Third Edition (Interscience Publishers, N.Y., N.Y., 1979), Volume 5, pages 163–193. Teachings as to the properties of these cements disclosed in these publications are incorporated by reference herein.

These cements may be used to prepare mortars containing 100 parts by weight of cement, from about 200 to about 300 parts by weight of sand, from about 38 to about 50 parts by weight of water and an effective amount of the additive mixture of a salt of the condensation product of naphthalenesulfonic acid and formaldehyde with a zinc salt to improve the compressive strength of the hardened mortar.

Further, these cements may be used to prepare concrete mixes containing 100 parts by weight of cement, from about 140 to about 260 parts by weight of sand, from about 100 to about 200 parts by weight of gravel, from about 35 to about 60 parts by weight of water and an effective amount of one of these additive mixtures sufficient to improve compressive strength of the hardened concrete with the preferred concrete mixes containing 100 parts by weight of cement, from about 160 to about 230 parts by weight of sand, from about 140 to about 180 parts by weight of gravel, from about 38 to about 50 parts by weight of water and an effective amount of one of the additive mixtures sufficient to improve compressive strength of the hardened concrete. The concentration of the additive mixture in concrete mixes may vary from about 0.05 to about 3% (by weight of cement), preferably from about 0.3 to about 1% (by weight of cement) to obtain hardened concretes having improved compressive strengths. From about 0.1 to about 5% (by weight of cement) of the additive mixture may be added to mortar mixtures.

Likewise, these cements as well as oilwell cements may be used to prepare grouts and slurries by using an effective amount of an additive mixture of a salt of a condensation product of naphthalenesulfonic acid and formaldehyde plus a zinc salt to improve compressive strength and to reduce water content of these cementitious compositions.

For a fuller understanding of the nature and objects of this invention, reference may be made to the following examples. These examples are given merely to illustrate the invention and are not be be construed in a limiting sense. All quantities, proportions and percentages are by weight and all references to temperature are °C. unless otherwise indicated.

EXAMPLE I

This example describes preparation of a mixture of low salt content commercial naphthalenesulfonic acid formaldehyde condensation product and zinc sulfate having a 47/26 solids/solids ratio.

A flask was charged with 144 g of 40% solution of a low salt content commercial sodium naphthalenesulfonic acid formaldehyde condensation product and 36 g of zinc sulfate heptahydrate (20 g of 100% $ZnSO_4$) and 14 g of water to prepare a mixture containing 29.6% by weight active low salt content condensation product.

EXAMPLE II

This example describes preparation of a mixture of low salt content commercial naphthalenesulfonic acid formaldehyde condensation product and zinc sulfate having a 66/34 solids/solids ratio.

Following the procedure of Example I, 144 g of 40% low salt content commercial naphthalenesulfonic acid formaldehyde condensation product (57.6 g of a 100% product) and 54 g. of zinc sulate heptahydrate (30 g of 100% $ZnSO_4$) and 22 g water were mixed to give 29.2% active low salt content condensation product.

EXAMPLE III

This example describes preparation of a mixture of low salt content commercial naphthalenesulfonic acid formaldehyde condensation product and zinc chloride having a 77/23 solids/solids ratio.

Following the procedure of Example I, 288 g of 40% low salt content commercial naphthalenesulfonic acid (115.2 g of a 100% product), 34 g of zinc chloride and 51 g of water were blended to prepare a mixture containing a 30.9% active low salt content condensation product.

EXAMPLE IV

This example describes prepartion of a mixture of low salt content commercial naphthalenesulfonic acid formaldehyde condensation product and zinc chloride have a 69/31 solids/solids ratio.

Following the procedure of Example I, 144 g of 40% low salt content commercial naphthalenesulfonic acid formaldehyde condensation product (56.6 g of 100% product), 26 g of zinc chloride and 39 g of water were mixed to prepare a mixture containing 27.6% by weight active low salt content condensation product.

EXAMPLE V

This example describes evaluation of mixtures of naphthalenesulfonic acid formaldehyde condensation products and zinc sulfate in mortar mix.

Samples from Examples I, II, III, IV and the control were evaluated for slump, air and compressive strength and compared to the control in a mortar type mix described in Table II.

TABLE II

| Proportions Used in Mortar Type Mix | |
|---|---|
| Component | Lab Mix Weight (grams) |
| Cement - Type I | 400 |
| Sand (Fineness Modulus 7.9) | 1200 |
| Gravel (10 mm) | 0 |
| Water | 167.5 |

In the concrete batching procedure, a Hobart mixer was used. The sand was added to the mixer and water containing the additive and the cement were added simultaneously to the sand. The cement was mixed for 3 minutes, allowed to stand for 3 minutes and mixed for an additional 2 minutes. Batching was done at 70°–75° F. and a 50% relative humidity.

Slump was measured immediately after mixing using a pipe (4¼" H×3" ID) set in a flat plate. The pipe was filled incrementally ⅓ at a time and consolidated by rodding after each increment was added. The top of the pipe was struck flat and the base cleared of extraneous cement. The pipe was then raised and the slump measured in inches as the difference between the top of the pipe and the top of the cement. Air content in the fresh cement was checked using a Chaser air indicator. Specimens used for compressive strength testing were 3×6 in. (75×150 mm) cylinders consolidated by rodding and cured at 70°–75° F., and 100% relative humidity. Data was collected after 7 days based on an average of values obtained from three cylinders following ASTM standard C-39-72. Results of these evaluations are shown in Table III entitled, Slump and Compressive Strength Tests at 18% Water Reduction.

TABLE III

| Cement Evaluations at 18% Water Reduction | | | | |
|---|---|---|---|---|
| Example No. | % Active | Additive Added (g) | Slump (in.) | % Air Content | 7-Days Compressive Strength (Av. of 3) |
| Control | | | | | |
| (1) | 40 | 10.0 | 1¾ | 4+ | 3735 |
| I | 30 | 13.33 | 1⅜ | 4+ | 3950 |
| II | 26 | 15.38 | 1¼ | 3.5 | 4786 |
| III | 31 | 12.9 | 1¼ | 3.5 | 4693 |
| IV | 28 | 14.3 | ⅞ | 3.5 | to tight to cast |

(1) Commercial sodium salt of naphthalenesulfonic acid formaldehyde condensate with low sodium content The results shown in Table I indicate that the mixtures of low salt content commercial condensate and the divalent zinc added either as a sulfate or chloride increases the compressive strength of mortar significantly. The best results are obtained when zinc is present at about 34%, Example II.

EXAMPLE VI

This example describes the evaluation of 0.5% based on the weight of cement of the Example II mixture of zinc and a low salt content sodium salt of a condensation product of naphthalenesulfonic acid and formaldehyde in a concrete mix as compared to Melment L-10 (a sulfonated melamine formaldehyde condensate), Mighty-150 (a formulated sulfonated naphthalene formaldehyde condensate), a low salt content commercial sulfonated naphthalene formaldehyde condensate and a control. The water/cement ratios in mixes containing additives were 0.44 and was 0.49 for the control, a concrete mix without additives.

Table IV entitled "Standard Mix Proportion Non-Air Entrained Concrete" shows the standard mix proportion used in the concrete mix. This table is from the Portland Cement Association Engineering Bulletin entitled, "Design and Control of Concrete Mixtures", Eleventh Edition, July 1968. The standard mix proportion given in Table IV was used as the control giving a reasonable workability for the tests. In the evaluation of the additives, water in the standard mix was reduced 10% to achieve a workable concrete mix. The cement used was Type I. Sand and ⅜ inch (10 mm) gravel meeting ASTM standard C-33-74a. were used. Except for a minor modification, the concrete batching procedure using a 2½ cu ft (0.07 m³) tilting drum mixer followed ASTM standard C-b 192-69.

Slump was measured according to ASTM standard C143-74. The air content in the fresh concrete was periodically checked by the pressure method (ASTM standard C-b 321-75); however, for convenience, the Chaser air indicator was used more frequently. Specimens used for compressive strength testing were 3×6 in. (75×150 mm) cylinders, consolidaed by rodding and cured at 70°-75° F. and at 100% relative humidity. Data were collected at 1, 7 and 28 days based on the average of values obtained from three cylinders following ASTM standard C39-72. Results of these evaluations are shown in Table V entitled, "Compressive Strength Tests at 10% Water Reduction".

TABLE IV

| Standard Mix Proportion Non-Air Entrained Concrete | | |
|---|---|---|
| Water/Cement Ratio | = | 0.5 |
| Coarse Aggregate | = | ⅜ in. (10 mm) |
| Fine Aggregate | = | Fineness Modulus 2.9 |

| Component | Weight | |
|---|---|---|
| | lb. | kg. |
| Cement | 770 | 349.3 |
| Water | 385 | 174.6 |
| Sand | 1510 | 663.9 |
| Gravel | 1150 | 521.6 |

Table V shows comparative data on compressive strength and slump tests at 10% water reduction.

Air entrainment, expressed as % air content for the Example II mixture was in the proper range for good workability.

These data show that a mixture of zinc sulfate and low salt content sodium salt of a condensation product of naphthalenesulfonic acid and zinc sulfate had improved compressive strength over three commercial superplasticizers and the control.

TABLE V

| Compressive Strength and Slump Tests With Concrete at 10% Water Reduction | | | | | |
|---|---|---|---|---|---|
| | Example II | Melment L-10 | Mighty 150 | Low Salt Content | Control |
| Slump (in) | 3 | 10¼ | 10 | 5 | 6¼ |
| % Air | 5 | 2¼ | 2¼ | 3¼ | 4 |
| Compressive Strength (psi) After | | | | | |
| 1 day | 3012 | 2881 | 2631 | 3143 | 1952 |
| 7 days | 4893 | 4333 | 5321 | 4357 | 3333 |
| 28 days | 5881 | 4928 | 5523 | 4904 | 3904 |

While the invention has been described with reference to certain specific embodiments thereof, it is understood that it is not to be so limited since alterations and changes may be made therein which are within the full and intended scope of the claims.

What is claimed is:

1. A superplasticizer for cementitious materials comprising a mixture of from about 65 to about 75 parts by weight of a salt of a condensation product of naphthalenesulfonic acid and formaldehyde and from about 25 to about 35 parts by weight of a zinc salt.

2. The superplasticizer of claim 1 wherein the zinc salt in the mixture is a zinc salt selected from the group consisting of zinc sulfate, zinc chloride and zinc acetate.

3. The superplasticizer of claim 2 wherein the zinc salt is zinc sulfate.

4. A hardened cementitious composition having improved compressive strength and reduced water content prepared from a cementitious composition and an effective amount of the superplasticizer of claim 1.

5. The hardened cementitious composition of claim 4 wherein the composition is prepared from a concrete mix containing 100 parts by weight of cement, from about 140 to about 260 parts by weight of sand, from about 100 to about 200 parts by weight of gravel, from about 35 to about 60 parts by weight of water.

6. The hardened cementitious composition of claim 4 wherein the composition is prepared from a mortar mix containing 100 parts by weight of cement, from about 200 to about 400 parts by weight of sand and from about 38 to about 50 parts by weight of water.

7. The hardened cementitious composition of claim 5 wherein from about 0.1 to about 5.0% by weight of the superplasticizer based on weight of cement is present.

8. The hardened cementitious composition of claim 6 wherein from about 0.05 to about 3.0% by weight of the superplasticizer based on weight of cement is present.

9. A process for production of a hardened cementitious composition of claim 4 comprising adding to a cementitious composition an effective amount of a superplasticizer which is a mixture of from about 65 to about 75 parts by weight of a salt of a condensation product of naphthalenesulfonic acid and formaldehyde and from about 25 to about 35 parts by weight of a zinc salt.

10. The process of claim 9 wherein the cementitious composition is a concrete mix containing 100 parts by weight of cement, from about 140 to about 260 parts by weight of sand, from about 100 to about 200 parts by weight of gravel, and from about 35 to about 60 parts by weight of water.

11. The process of claim 9 wherein the cementitious composition is a mortar mix containing 100 parts by weight of cement, from about 200 to about 400 parts by weight of sand and from about 38 to about 50 parts by weight of water.

12. The process of claim 10 wherein from about 0.1 to about 5.0% by weight of the superplasticizer based on weight of cement is present.

13. The process of claim 11 wherein from about 0.05 to about 3.0% by weight of the superplasticizer based on weight of cement is present.

* * * * *